US009398289B2

(12) United States Patent
Lee et al.

(10) Patent No.: US 9,398,289 B2
(45) Date of Patent: Jul. 19, 2016

(54) METHOD AND APPARATUS FOR CONVERTING AN OVERLAY AREA INTO A 3D IMAGE

(75) Inventors: Jin-sung Lee, Suwon-si (KR); Jong-sul Min, Suwon-si (KR); Oh-jae Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 902 days.

(21) Appl. No.: 13/023,887

(22) Filed: Feb. 9, 2011

(65) Prior Publication Data

US 2011/0193860 A1  Aug. 11, 2011

(30) Foreign Application Priority Data

Feb. 9, 2010  (KR) .................. 10-2010-0012026
Jan. 17, 2011  (KR) .................. 10-2011-0004537

(51) Int. Cl.
*H04N 13/02* (2006.01)
*H04N 13/00* (2006.01)

(52) U.S. Cl.
CPC ........... *H04N 13/026* (2013.01); *H04N 13/007* (2013.01)

(58) Field of Classification Search
CPC  G02B 27/2221; G06T 7/0022; G06T 7/0051; G06T 7/0065; G06T 11/60; G06T 15/00; H04N 7/00; H04N 13/00; H04N 13/0018; H04N 13/026; H04N 13/0221; H04N 13/0285; H04N 13/0292; H04N 13/0456
USPC ................................................. 345/419, 607
See application file for complete search history.

(56) References Cited

U.S. PATENT DOCUMENTS

| | | | |
|---|---|---|---|
| 7,161,614 B1 * | 1/2007 | Yamashita et al. ............... 348/42 |
| 8,488,848 B2 * | 7/2013 | Acosta-Cazaubon ......... 382/118 |
| 8,537,200 B2 * | 9/2013 | Zhang et al. .................... 348/42 |
| 2003/0146973 A1 * | 8/2003 | Swift ................... H04N 13/026 348/51 |
| 2007/0024614 A1 * | 2/2007 | Tam et al. ...................... 345/419 |
| 2007/0195082 A1 * | 8/2007 | Takanashi et al. ............. 345/419 |
| 2008/0018731 A1 * | 1/2008 | Era .................... H04N 13/0033 348/51 |
| 2008/0150945 A1 * | 6/2008 | Wang et al. .................... 345/427 |
| 2008/0192067 A1 * | 8/2008 | Barenbrug et al. ............ 345/607 |
| 2008/0278487 A1 * | 11/2008 | Gobert .......................... 345/420 |
| 2008/0285856 A1 * | 11/2008 | Zahavi ..................... G06K 9/50 382/195 |
| 2009/0002368 A1 * | 1/2009 | Vitikainen et al. ............. 345/422 |
| 2009/0315981 A1 * | 12/2009 | Jung et al. ....................... 348/43 |
| 2009/0316988 A1 * | 12/2009 | Xu ........................ G06K 9/6256 382/173 |
| 2010/0014781 A1 * | 1/2010 | Liu et al. ....................... 382/285 |
| 2010/0046837 A1 * | 2/2010 | Boughorbel ................. 382/173 |
| 2010/0073488 A1 * | 3/2010 | Murase ...................... 348/207.1 |
| 2010/0074594 A1 * | 3/2010 | Nakamura et al. ............... 386/92 |

(Continued)

*Primary Examiner* — Ulka Chauhan
*Assistant Examiner* — Sae Won Yoon
(74) *Attorney, Agent, or Firm* — Sughrue Mion, PLLC

(57) ABSTRACT

Apparatuses and methods for converting an overlay area of a two-dimensional (2D) monoscopic image into a three-dimensional (3D) image are provided. A depth map representing a perspective based on an input monoscopic image is generated to provide depth values of the input monoscopic image. At least one overlay area and at least one background image included in the input monoscopic image are then detected, and a depth value of one or more or both of the overlay area and the background image are corrected to a desired value. A stereoscopic image is generated based on the corrected depth value, such that the resulting stereoscopic image prevents inconsistent viewing depths between an overlay area and the background image in order to prevent viewer fatigue.

33 Claims, 5 Drawing Sheets

(56) References Cited

U.S. PATENT DOCUMENTS

| | | | |
|---|---|---|---|
| 2010/0080448 A1* | 4/2010 | Tam et al. | 382/154 |
| 2010/0091012 A1* | 4/2010 | Newton et al. | 345/419 |
| 2010/0182404 A1* | 7/2010 | Kuno | 348/43 |
| 2011/0032329 A1* | 2/2011 | Bauza et al. | 348/43 |
| 2011/0032338 A1* | 2/2011 | Raveendran et al. | 348/51 |
| 2011/0069152 A1* | 3/2011 | Wang et al. | 348/43 |
| 2011/0128351 A1* | 6/2011 | Newton et al. | 348/43 |
| 2011/0135194 A1* | 6/2011 | Izumi | 382/164 |
| 2011/0158504 A1* | 6/2011 | Turner et al. | 382/154 |
| 2011/0187832 A1* | 8/2011 | Yoshida | 348/46 |
| 2011/0242104 A1* | 10/2011 | Zhang et al. | 345/419 |
| 2012/0044241 A1* | 2/2012 | Chen et al. | 345/419 |
| 2012/0102435 A1* | 4/2012 | Han et al. | 715/848 |
| 2012/0249736 A1* | 10/2012 | Barrett et al. | 348/43 |
| 2012/0287233 A1* | 11/2012 | Wang et al. | 348/42 |

* cited by examiner

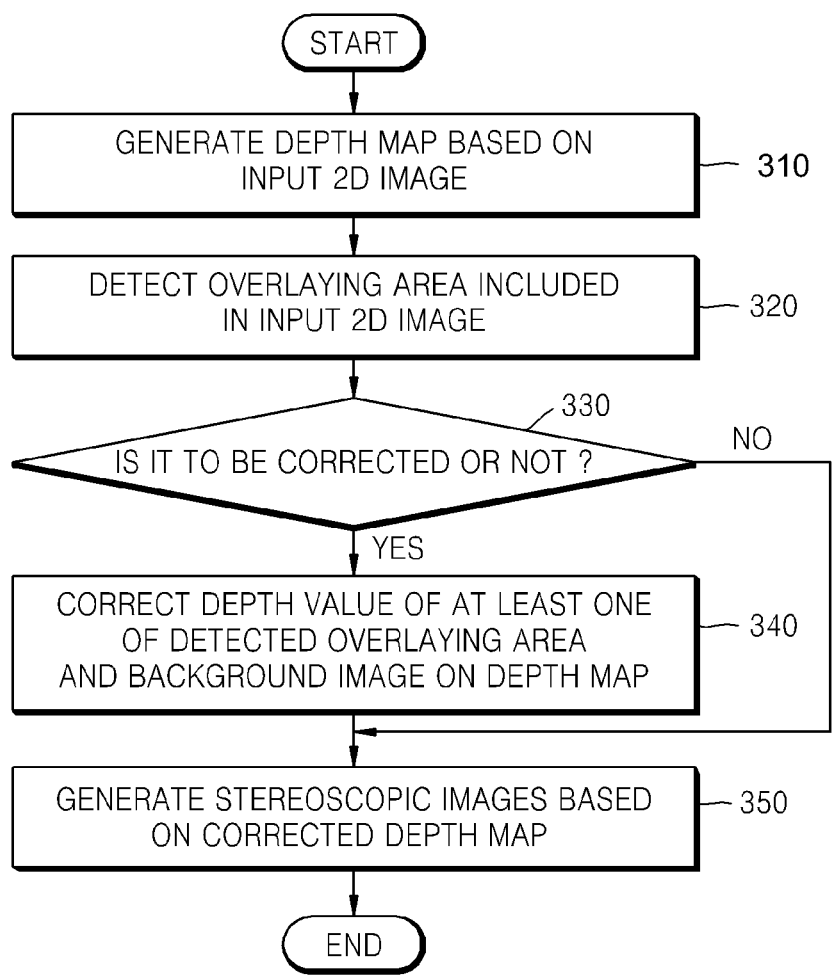

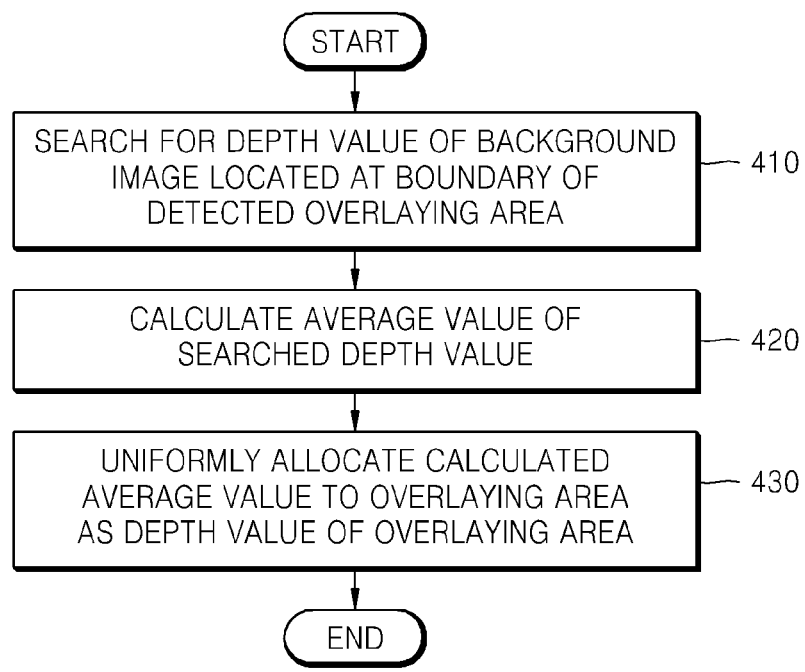

METHOD AND APPARATUS FOR CONVERTING AN OVERLAY AREA INTO A 3D IMAGE

CROSS-REFERENCE TO RELATED PATENT APPLICATION

This application claims priority from Korean Patent Application No. 10-2010-0012026, filed on Feb. 9, 2010, and Korean Patent Application No. 10-2011-0004537, filed on Jan. 17, 2011, both in the Korean Intellectual Property Office, the disclosures of which are incorporated herein in their entirety by reference.

BACKGROUND

1. Field

Apparatuses and methods consistent with embodiments relate generally to converting a two-dimensional (2D) image into a three-dimensional (3D) image, and more particularly to correcting a depth value of at least one of an overlay area and a background image when converting the 2D image into a 3D image.

2. Description of the Related Art

One of the factors that allow humans to perceive stereoscopic depth is a spatial difference between left and right retinas created by viewing an object from different directions, that is, from a left eye and a right eye. In order to make this difference perceivable on a two-dimensional (2D) plane of a display device, different, or stereoscopic, images are displayed to a left and a right eye, respectively, on the 2D plane of the display device. Thus, the viewer may feel as if they are viewing a three-dimensional (3D) image.

A 3D image may be generated by using a plurality of cameras when capturing an image, and may also be generated by converting a 2D image into a 3D image. In a 3D image conversion technique, a left eye image and a right eye image are respectively generated in consideration of binocular parallax. The left eye and right eye images are combined and reproduced, and the viewer may separately see the left eye image only through a left eye and see the right eye image only through a right eye by using shutter type glasses or polarization type glasses, thereby perceiving a 3D image.

However, in applying a related art 3D image conversion technique to a text region, there is no consideration for a text region included in a 2D image. If metadata for the text region added to image data is received, the text region is forcibly converted into a 2D image by using the metadata for the text region.

However, since a text region is forcibly converted into a 2D image, after converting the text region into a 3D image, a viewing disturbance may be generated due to an inconsistent depth between the text region and a background image. A distortion may also be generated in which the text region is displayed behind the background image, causing viewing fatigue.

SUMMARY

One or more exemplary embodiments provide a method and apparatus for converting an overlay area of a monoscopic two-dimensional (2D) image into a three-dimensional (3D) image, wherein an overlay area and a background image of the 2D image is detected and a desired depth value is applied to one or more of the overlay area and the background image to generate a stereoscopic 3D image, such that the desired depth value is based on a relationship between the overlay area and the background image. As a result, viewer fatigue due to a 3D effect of the overlay area is reduced by preventing an inconsistent viewing depth between the overlay area and the background image.

According to one aspect of an exemplary embodiment, there is provided a method of converting an overlay area into a 3D image, the method comprising: generating a depth map of an input monoscopic image, wherein the depth map provides depth values of the input monoscopic image; detecting at least one overlay area included in the input monoscopic image; correcting a depth value of at least one of the detected at least one overlay area and a background image on the depth map; and generating at least one stereoscopic image based on the corrected depth value.

In the correcting, the depth value of the detected at least one overlay area may be corrected to a value that is approximate to a depth value of a region around the detected at least one overlay area.

The correcting may further comprise: searching for at least one depth value of a background image located at a boundary of the detected at least one overlay area; calculating an average of the searched at least one depth value; and designating the calculated average as the corrected depth value of the detected at least one overlay area.

In the detecting of the detected at least one overlay area, at least one edge component and at least one color component of the input monoscopic image may be analyzed to extract the detected at least one overlay area.

In the generating a stereoscopic image, a left-eye stereoscopic image and a right-eye stereoscopic image may be generated by calculating binocular parallax values using the corrected depth value of the detected at least one overlay area.

The detecting may be performed based on position information of the at least one overlay area, wherein the position information of the at least one overlay area comprises coordinates indicating a position of the at least one overlay area or bitmap information showing a position of the at least one overlay area.

The correcting may further comprise determining whether to perform the correcting based on at least one of the position of the at least one overlay area, a size of the at least one overlay area, and whether the at least one overlay area is moved, and the correcting may be performed only when it is determined to perform the correcting as a result of the determining.

In the correcting, objects of the background image may be corrected to have identical depth values.

The correcting may be performed such that a difference between depth values of objects of the background image is reduced.

The correcting may further comprise correcting a depth value of an overlay area if the depth value is higher by a predetermined depth than a highest depth value among depth values of objects of the background; or correcting a depth value of the overlay area if the depth value is higher by a predetermined depth than an average of depth values of the objects of the background image.

The correcting may further comprise correcting a depth value of the at least one overlay area to a depth value of a center of an overlay area or a boundary of an overlay area.

The method may further comprise filtering the depth value of the overlay area and the depth value of the background image.

The correcting may comprise correcting a depth value of at least one of the detected at least one overlay area and the background image to a depth value that is obtained by respectively applying weights to the depth value of the background image and the depth value of the overlay area.

The correcting may comprise correcting depth values of a plurality of overlay areas to one of a minimum value, a maximum value, or an average value of depth values of the plurality of overlay areas may be set as a depth value of each of the overlay areas.

The correcting may comprise correcting at least one depth value of at least one overlay area to a depth value input by a user.

The generating of at least one stereoscopic image may be performed by referring to pixel values in the background image.

According to another aspect of an exemplary embodiment, there is provided an apparatus for converting an overlay area into a 3D image, comprising: a depth map generating unit generating a depth map of an input monoscopic image, wherein the depth map provides depth values of the input monoscopic image; an overlay area detection unit detecting at least one overlay area included in the input monoscopic image; a depth value correction unit correcting a depth value of at least one of the detected at least one overlay area and a backgrounds image on the depth map; and a stereoscopic image generating unit generating at least one stereoscopic image based on the corrected depth value.

The depth value correction unit may correct the depth value of the detected at least one overlay area to a value that is approximate to a depth value of a region around the detected at least one overlay area.

The depth value correction unit may further comprise: a searching unit searching for at least one depth value of a background image located at a boundary of the detected at least one overlay area; and an average value calculation unit calculating an average value of the searched at least one depth value, wherein the calculated average value is designated as the corrected depth value of the detected at least one overlay area.

The detection unit may analyze an edge component and a color component of the input monoscopic image to extract at least one overlay area.

The stereoscopic image generating unit may generate a left-eye stereoscopic image and a right-eye stereoscopic image by calculating binocular parallax values using the corrected depth value of the at least one overlay area.

According to another aspect of an exemplary embodiment, there is provided a computer-readable recording medium having embodied thereon a computer program product that, when executed by a computer, performs the above-described method.

BRIEF DESCRIPTION OF THE DRAWINGS

The above and/or other aspects will become more apparent from the following description of exemplary embodiments thereof with reference to the attached drawings, in which:

FIG. 3 is a flowchart illustrating a method of converting an overlay area into a 3D image, according to exemplary embodiment;

FIG. 4 is a flowchart illustrating a method of correcting a depth value of the overlay area of FIG. 2, according to an exemplary embodiment;

Like reference numerals denote like elements in some of the drawings. The drawings illustrate the exemplary embodiments, but are not illustrated according to a reduced scale, and some elements may be exaggerated for clarity of description.

DETAILED DESCRIPTION OF EXEMPLARY EMBODIMENTS

The attached drawings illustrating exemplary embodiments are referred to in order to gain a sufficient understanding of the exemplary embodiments, the merits thereof, and the objectives accomplished by the implementation of the exemplary embodiments.

Hereinafter, the exemplary embodiments will be described in detail by explaining exemplary embodiments with reference to the attached drawings.

Figure 1:
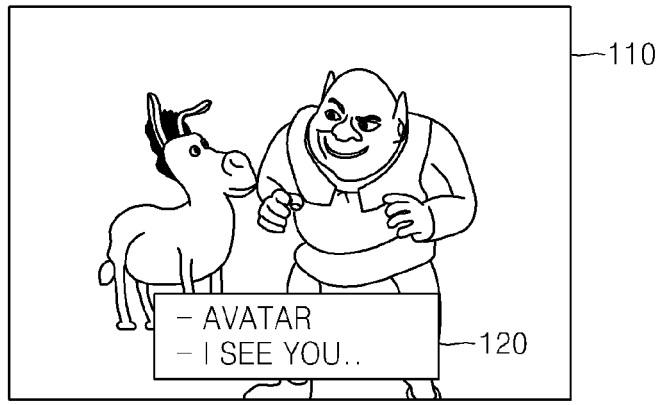
FIG. 1 is a schematic view illustrating a monoscopic image frame including an overlay area.

FIG. 1 is a schematic view illustrating a monoscopic image frame 110 including an overlay area, which is exemplified in FIG. 1 as a text region 120. The overlay area may be a text region, an On Screen Display (OSD) area or a logo area of a broadcasting network. Although the following exemplary embodiment is discussed and illustrated with regard to a text region, the following exemplary embodiments are applicable to any type of overlay area.

Referring to FIG. 1, the monoscopic image frame 110 includes the text region 120. An area of the image frame 110 other than the text region 120 may be regarded as a background. Various subjects and objects may be a part of the background, to which different binocular parallax values may be applied to display the subjects three-dimensionally.

According to related art, when the monoscopic image frame 110, which may be a two-dimensional (2D) image, is converted into a three-dimensional (3D) image, the text region 120 is also converted into a 3D image. Different depth values may be allocated thereto and different binocular parallax values may be applied to various characters of the text region 120. Meanwhile, when converting only the text region 120 into a 3D image, a binocular parallax value for the text region 120 is simply set as "0", and thus the text region 120 may be placed at the very front or at the very end of a z-axis related to perspective, regardless of the depth of the background.

In this case, a viewer may feel fatigue when viewing an image for a long period of time due to the text region 120 having an inconsistent depth with respect to the depth of the background.

Accordingly, in one exemplary embodiment, after detecting an overlay area of a 2D image, a predetermined depth value is uniformly allocated to the overlay area based on a depth value of a background. This uniform depth value prevents discontinuity between depths of the overlay area and the background.

In addition, in another exemplary embodiment, after an overlay area of a 2D image is detected, a depth value of a background image is corrected when converting the 2D image into a 3D image.

Figure 2:
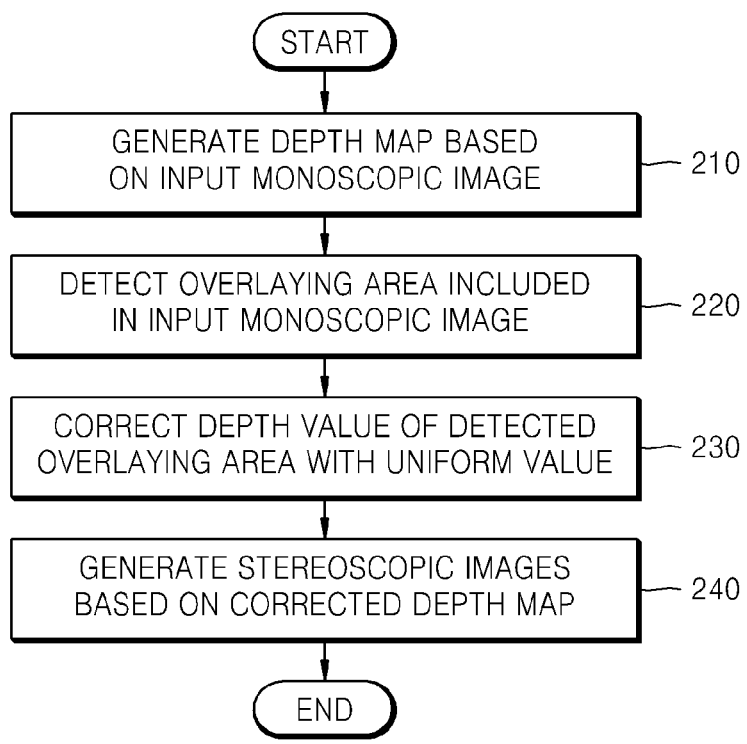
FIG. 2 is a flowchart illustrating a method of converting an overlay area into a 3D image, according to an exemplary embodiment.

FIG. 2 is a flowchart illustrating a method of converting an overlay area into a 3D image, according to an exemplary embodiment.

Referring to FIG. 2, the method of converting an overlay area into a 3D image includes generating a depth map displaying a perspective based on an input monoscopic image (operation 210), detecting an overlay area included in the input monoscopic image (operation 220), correcting a depth value of the detected overlay area on the depth map to a uniform depth value (operation 230), and generating a stereoscopic image based on the corrected depth map (operation 240).

First, in operation 210, a depth map based on an input 2D image is generated. A depth map refers to a map that shows 3D distances between objects of the image, and pixels of the image are represented by values between 0 to approximately 255 on the depth map. Colors between black and white are used to represent the value of the pixels Black (low value) refers to a position far from the viewer, and white (high value) refers to a position near the viewer.

Next, in operation 220, an overlay area included in the monoscopic image is detected. For example, an overlay area may be detected by analyzing edge components and color components of the monoscopic image. Here, a polygonal area corresponding to the overlay area may be extracted.

Also, the overlay area may be detected based on not only edges or colors, but also low-level characteristics of the monoscopic image such as texture information. Alternatively, the text region may be detected by using a transition region searching method based on the characteristic that edges are displayed with a different color from characters in order to give a height to the characters inserted into the monoscopic image.

Next, in operation 230, a depth value of the detected overlay area on the depth map is corrected. A correction value for the overlay area is uniformly allocated. That is, a uniform depth value is supplied to each of the characters of the overlay area so that the depth of the characters does not vary.

When correcting a depth value of the overlay area, a reference for the correction value may be depth values of an area around the overlay area. That is, the overlay area is to have a depth value similar to the depth values of a background image around the overlay area. As a result, the overlay area and the background image are displayed having consistent depths when perceived as a 3D image. Accordingly, the depth value of the overlay area is corrected with a value that is approximate to the depth value allocated to the background image around the detected overlay area, according to the one exemplary embodiment.

Finally, in operation 240, left-eye and right-eye stereoscopic images are generated based on the depth map completed by using the above correction process. That is, binocular parallaxes are calculated with reference to the depth map, and objects displayed in the image are each moved according to their own binocular parallax, thereby forming a left-eye image and a right-eye image.

Accordingly, in perceiving the 3D image as described above, the overlay area within the image has a similar depth value to that of the background, and the same binocular parallax values are given to the characters in the text region at the same time, and thus a distortion of the image is prevented.

FIG. 3 is a flowchart illustrating a method of converting an overlay area into a 3D image, according to another exemplary embodiment.

In operation 310, a depth map with respect to an input 2D image is generated.

In operation 320, an overlay area included in a monoscopic image is detected.

The overlay area may be detected based on position information of the overlay area. For example, if an overlay area to be detected is an OSD area that is generated by a display device, position information of the OSD area may be provided from the display device to detect the OSD area. The position information of the OSD area may be in the form of coordinates indicating the OSD area. However, alternatively, the OSD area may be in the form of a bitmap denoted by 1, and a background image other than the OSD area may be in the form of a bitmap denoted by 0.

In operation 330, a determination is made as to whether a depth value of at least one of the detected overlay area and a background image on a depth map is to be corrected or not.

If the depth value is to be corrected, the method proceeds to operation 340, and if not, the method proceeds to operation 350.

According to the current exemplary embodiment illustrated in FIG. 3, instead of always correcting a depth value of an overlay area on a depth map, the correction is performed only when the overlay area satisfies a predetermined condition. This method is in contrast to that described above with regard to FIG. 2, where a correction is always applied to correct the depth value to a uniform value.

For example, whether to correct the depth value may be determined according to a position of the overlay area, a size of the overlay area or whether the overlay area is moving or not. More specifically, the depth value on the depth map with respect to at least one of the overlay area and the background image may be corrected if the overlay area is located in a center of the image frame 110, or if the size of the overlay area is greater than a predetermined critical value, or if the overlay area is not moving.

In operation 340, a depth value of at least one of the detected overlay area and the background image on the depth map is corrected.

That is, three types of methods of correcting a depth value are performed in the current exemplary embodiment.

In a first correction method, only a depth value of a background image on a depth map may be corrected.

In this first correction method, i) objects of a background image may be corrected so as to have identical depth values or ii) differences between depth values of the objects of the background image may be reduced. In the case of ii), the differences between the depth values of the objects of the background image may be reduced by a predetermined ratio.

For example, when this first correction method is performed in the case when an OSD area is displayed on a screen, a background image may be viewed as a 2D image or almost as a 2D image, and thus the viewer may see the OSD area feeling less fatigue.

In a second correction method, only a depth value of an overlay area on a depth map may be corrected.

In this second correction method, i) a binocular parallax value of an overlay area may be set as 0, ii) a depth value that is higher by a predetermined depth than the highest depth value among depth values of objects of a background may be set as a depth value of an overlay area, iii) a depth value that is higher by a predetermined depth than an average of depth values of objects of a background image may be set as a depth value of an overlay area, iv) a depth value of an overlay area in a center or at a boundary of the overlay area may be set as a depth value of the whole overlay area, v) a depth value that is obtained by respectively applying weights to a depth value of a background image and a depth value of an overlay area may be set as a depth value of an overlay area, vi) a predetermined default value may be set as a depth value of an overlay area, vii) if there are a plurality of overlay areas, a minimum value, a maximum value, or an average of depth values of the plurality of overlay areas may be set as a depth value of each of the overlay areas, viii) a depth value input by the user may be set as a depth value of an overlay area, or ix) a depth value of a background image around an overlay area may be used to correct a depth value of the overlay area on the depth map.

Here, option v), in which a depth value that is obtained by respectively applying weights to a depth value of a background image and a depth value of an overlay area may be set as a depth value of the overlay area, will be described with reference to Equation 1 below. For example, when weights to be applied to a depth value of a background image and a depth value of an overlay area are 0.7 and 0.3, respectively, an average value Dbaver of the depth values of objects of the background image are calculated, and the average Dbaver of the depth values of the objects of the background image are multiplied by 0.7, and the depth value Do of the overlay area is multiplied by 0.3, and these two values are summed to thereby calculate a corrected depth value Dco that is to be set as a new depth value of the overlay area.

$$Dco=0.7 \times Dbaver+0.3 \times Do \quad \text{[Equation 1]}$$

Meanwhile, option vii), in which a depth value with respect to an overlay area is corrected by using a depth value of a background image around the overlay area, will be described later with reference to FIG. 4.

When only the depth value of the overlay area on the depth map is corrected according to the second correction method, the depth value of the overlay area greatly differs from the depth value of the background image, and distortion may be generated at a boundary of the overlay area. Thus, in order to remove this distortion, according to another exemplary embodiment, a smoothing filter such as a median filter, a weighted average filter, or a maximum filter may be applied to the overlay area.

However, according to an exemplary embodiment, all kinds of filters which can remove a difference between the depth value of the overlay area and the depth value of the background image may be used besides the smoothing filter.

In a third correction method, depth values of both a background image and an overlay area on a depth map may be corrected.

According to another exemplary embodiment, a determination as to which of the first through third correction methods described above will be used to perform correction may be determined according to the type of overlay area.

For example, if an overlay area is a text area, only a depth value of the overlay area is corrected, and if an overlay area is an OSD area, both depth values of the overlay area and a background image are corrected, or only a depth value of the background image may be corrected.

In operation 350, left-eye and right-eye stereoscopic images may be generated based on the depth map that is completed by the correction operation 340, or left-eye and right-eye stereoscopic images may be generated based on the depth map with an uncorrected depth value of operation 310.

Here, left-eye and right-eye stereoscopic images may be generated not by referring to pixel values in the overlay area but by referring to only pixel values in the background image.

FIG. 4 is a flowchart illustrating a method of correcting a depth value of the overlay area of FIG. 1.

Referring to FIG. 4, in one exemplary embodiment, an average depth value of a background image is used in correcting a depth value of an overlay area.

In operation 410, at least one depth value is searched for with respect to a background image positioned on edges of the detected overlay area. In operation 420, an average of the at least one searched depth value is calculated, and in operation 430, the calculated average value may be uniformly allocated as the depth value of the overlay area.

In addition, the median or mode of the depth values of the background image around the overlay area may be searched for and applied.

Figure 5A:
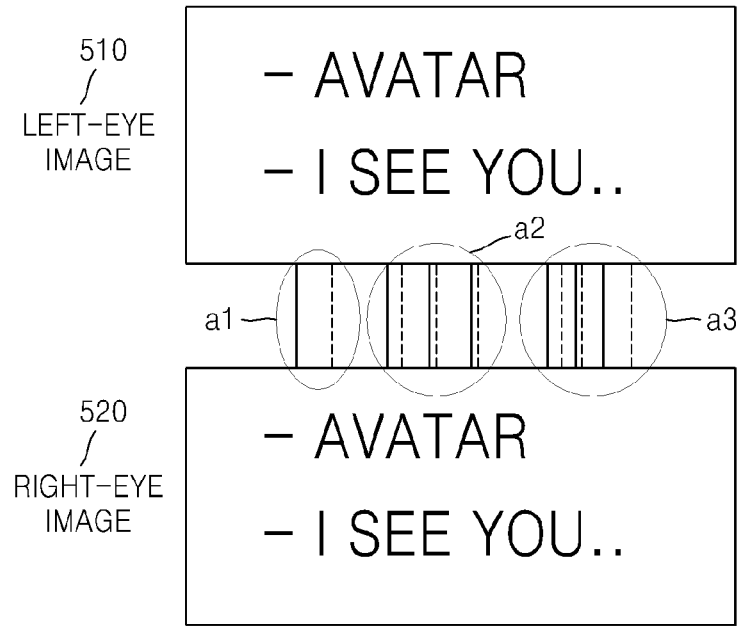
FIG. 5A is a schematic view of an overlay area that is converted into a 3D image according to a related art method.
Figure 5B:
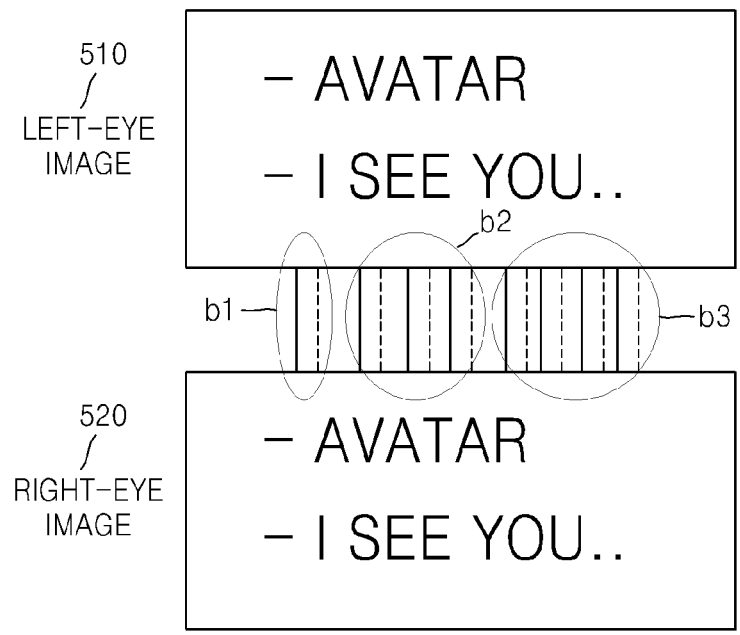
FIG. 5B is a schematic view of an overlay area that is converted into a 3D image, according to an exemplary embodiment.

FIG. 5A is a schematic view of an overlay area that is converted into a 3D image using a related art method. FIG. 5B is a schematic view of an overlay area that is converted into a 3D image using a method according to an exemplary embodiment.

First, FIG. 5A illustrates a left-eye image 510 and a right-eye image 520 with respect to an overlay area. Referring to positions a1, a2, and a3 of characters of a text displayed on the left-eye image 510 and the right-eye image 520, binocular parallax values applied to the characters of the left-eye image 510 and the right-eye image 520 are different from each other. Here, solid lines denote the positions of the characters of the left-eye image 510, and dotted lines denote the positions of the characters of the right-eye image 520. This difference in the positions of the characters will be clearer when compared to corresponding positions b1, b2, and b3 illustrated in FIG. 5B. When a text is displayed in a related art 3D mode as illustrated in FIG. 5A, the viewer may have difficulty in reading the text and feel increased fatigue when viewing for a long period of time.

However, referring to FIG. 5B, the method of converting an overlay area into a 3D image is applied according to an exemplary embodiment. Referring to the positions b1, b2, and b3 of texts of the left-eye image 510 and the right-eye image 520, binocular parallax values applied to each character of the text are uniform. This uniformity in the binocular parallax values is clearly seen when compared with the corresponding binocular parallax values applied at positions a1, a2, and a3 illustrated in FIG. 5A. When the text is displayed as illustrated in FIG. 5B, no distortion is generated in the overlay area. Thus, the viewer may read the text more comfortably.

Figure 6:
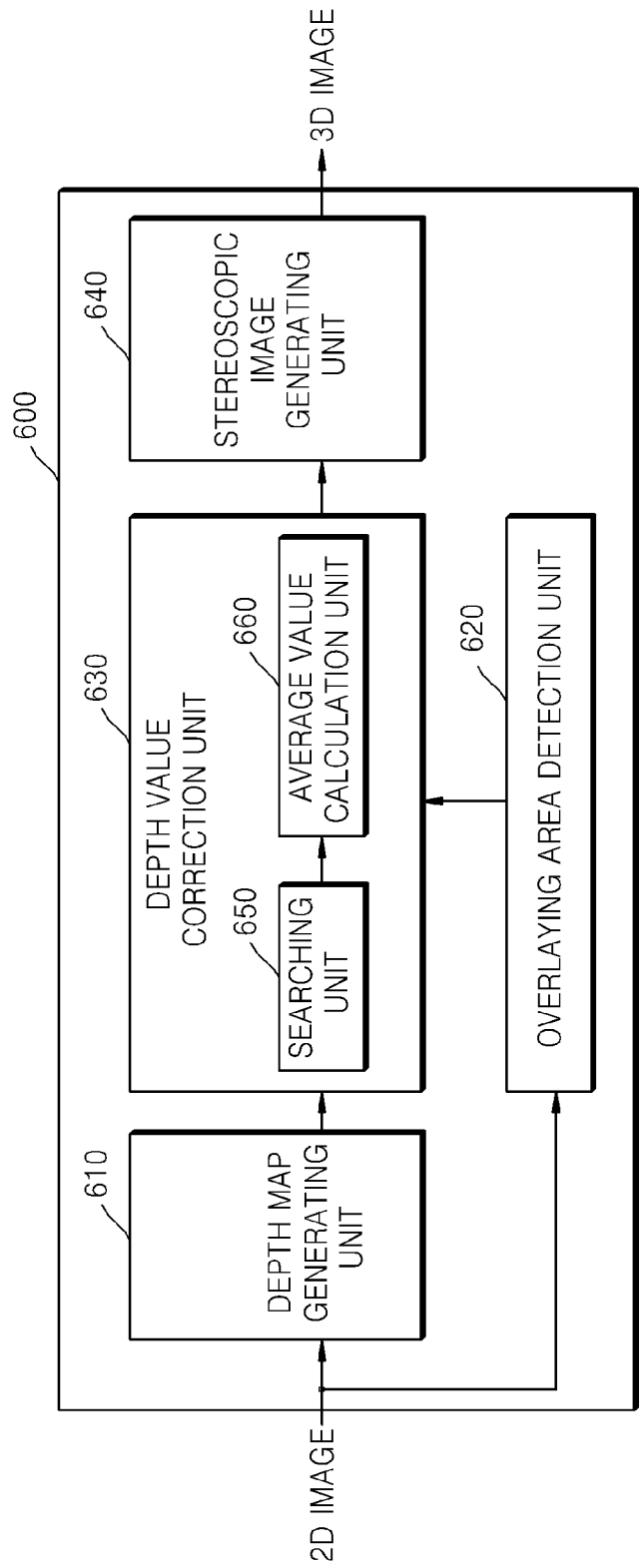
FIG. 6 is a functional block diagram illustrating a 3D overlay area image converting apparatus, according to an exemplary embodiment.

FIG. 6 is a functional block diagram illustrating a 3D image converting apparatus 500 for an overlay area, according to an exemplary embodiment.

Referring to FIG. 6, the 3D image converting apparatus 600 for an overlay area includes a depth map generating unit 610 that generates a depth map representing a perspective based on an input monoscopic image. An overlay area detection unit 620 detects an overlay area included in the input monoscopic image, and a depth value correction unit 630 corrects a depth value of at least one of the detected overlay area and a background image on the depth map. A stereoscopic image generating unit 640 generates a stereoscopic image based on the corrected depth map.

Meanwhile, the depth value correction unit 630 may further include a searching unit 650 that searches for at least one depth value with respect to a background image located at a boundary of the detected overlay area. An average value calculation unit 660 calculates an average of the searched at least one depth value.

According to one exemplary embodiment, different binocular parallax values might be applied to the same characters of an overlay area depending on positions thereof before converting the overlay area into a 3D image. However, after applying the exemplary method of converting an overlay area into a 3D image, a uniform binocular parallax value is applied to the overlay area to provide the text region with a uniform depth in order to prevent distortion. The text region has a depth similar to that of a region around the overlay area, and thus viewer fatigue due to a 3D effect of the overlay area is also reduced.

The exemplary embodiments may be embodied as computer programs and may be implemented in general-use digital computers that execute the programs using a computer-readable recording medium.

Also, data structures used in the exemplary embodiments as described above may be written to a computer-readable recording medium through various means.

Examples of the computer-readable recording medium include magnetic storage media (e.g., ROM, floppy disks, hard disks, etc.), optical recording media (e.g., CD-ROMs, or DVDs), and storage media such as carrier waves (e.g., transmission through the Internet).

While the exemplary embodiments have been particularly shown and described with reference to preferred embodiments thereof, it will be understood by those skilled in the art that various changes in form and details may be made therein without departing from the spirit and scope of the exemplary embodiments as defined by the appended claims. The preferred embodiments should be considered in descriptive sense only and not for purposes of limitation. Therefore, the scope of the exemplary embodiments is defined not by the detailed description but by the appended claims, and all differences within the scope will be construed as being included in the exemplary embodiments.

What is claimed is:

1. A method of converting an overlay area into a three-dimensional (3D) image, the method comprising:
   generating a depth map of an input monoscopic image, wherein the depth map provides depth values of the input monoscopic image;
   detecting at least one overlay area included in the input monoscopic image, wherein the at least one overlay area comprises at least one of a text area and an on screen display area;
   selectively correcting a depth value of at least one of the detected at least one overlay area and a background image on the depth map, according to determination whether a type of at least one of the detected at least one overlay area is related to the text area or the on screen display area; and
   generating at least one stereoscopic image based on the corrected depth value,
   wherein the selectively correcting is performed by uniformly allocating a predetermined depth value to the detected at least one overlay area, when the correcting is performed on the detected at least one overlay area,
   wherein the selectively correcting comprises:
      when the detected at least one overlay area is the text area, correcting only the depth value of the detected at least one overlay area; and
      when the detected at least one overlay area is the one screen display area, correcting both of the depth values of the detected at least one overlay area and the background image, or only the depth value of the background image, and
   wherein the detecting comprises detecting the at least one overlay area by analyzing at least one color component of the input monoscopic image to extract the at least one overlay area.

2. The method of claim 1, wherein the correcting comprises correcting the depth value of the detected at least one overlay area to a value that is approximate to a depth value of a region around the detected at least one overlay area.

3. The method of claim 2, wherein the correcting further comprises:
   searching for at least one depth value of a background image located at a boundary of the detected at least one overlay area;
   calculating an average of the searched at least one depth value; and
   designating the calculated average as the corrected depth value of the detected at least one overlay area.

4. The method of claim 2, wherein the detecting comprises detecting the at least one overlay area by analyzing at least one edge component of the input monoscopic image to extract the at least one overlay area.

5. The method of claim 2, wherein the generating comprises generating at least one stereoscopic image, including a left-eye stereoscopic image and a right-eye stereoscopic image, by calculating binocular parallax values using the corrected depth value of the detected at least one overlay area.

6. The method of claim 1, wherein the detecting is performed based on position information of the at least one overlay area,
   wherein the position information of the at least one overlay area is in the form of coordinates indicating a position of the at least one overlay area or bitmap information showing a position of the at least one overlay area.

7. The method of claim 1, wherein the correcting comprises determining whether to perform the correcting based on at least one of a position of the at least one overlay area, a size of the at least one overlay area, and whether the at least one overlay area is moving, and wherein the correcting is performed only when it is determined to perform the correcting as a result of the determining.

8. The method of claim 1, wherein the correcting comprises correcting depth values of objects of the background image to have identical depth values.

9. The method of claim 1, wherein the correcting comprises correcting depth values of objects of the background image such that a difference between depth values of the objects of the background image is reduced.

10. The method of claim 1, wherein the correcting comprises correcting a depth value of an overlay area if the depth value is higher by a predetermined depth than a highest depth value among depth values of objects of the background image; or correcting a depth value of the overlay area if the depth value is higher by a predetermined depth than an average of depth values of the objects of the background image.

11. The method of claim 1, wherein the correcting comprises correcting a depth value of the at least one overlay area to a depth value of a center of an overlay area or a boundary of an overlay area.

12. The method of claim 11, wherein the correcting further comprising filtering the depth value of the overlay area and the depth value of the background image to remove a difference between the depth value of the overlay area and the depth value of the background image.

13. The method of claim 1, wherein the correcting comprises correcting a depth value of at least one of the detected at least one overlay area and the background image to a depth value that is obtained by respectively applying weights to the depth value of the background image and the depth value of the overlay area.

14. The method of claim 1, wherein the correcting comprises correcting depth values of a plurality of overlay areas to one of a minimum value, a maximum value, or an average value of depth values of the plurality of the overlay areas.

15. The method of claim 1, wherein the correcting comprises correcting at least one depth value of at least one overlay area to a depth value input by a user.

16. The method of claim 1, wherein the generating comprises generating the at least one stereoscopic image by referring to pixel values in the background image.

17. An apparatus converting an overlay area into a three-dimensional (3D) image, comprising:
at least one processor configured to implement:
a depth map generating unit configured to generate a depth map of an input monoscopic image, wherein the depth map provides depth values of the input monoscopic image;
an overlay area detection unit configured to detect at least one overlay area included in the input monoscopic image, wherein the at least one overlay area comprises at least one of the text area and an on screen display area;
a depth value correction unit configured to selectively correct a depth value of at least one of the detected at least one overlay area and a background image on the depth map, according to determination whether a type of at least one of the detected at least one overlay area is related to the text area or the on screen display area; and
a stereoscopic image generating unit which generates at least one stereoscopic image based on the corrected depth value,
wherein the depth value correction unit is further configured to, when the depth value correction unit corrects the detected at least one overlay area, perform uniform allocation of a predetermined depth value of the detected at least one overlay area,
wherein the depth value correction unit is further configured to, when the detected at least one overlay area is the text area, correct only the depth value of the detected at least one overlay area,
wherein the depth value correction unit is further configured to, when the detected at least one overlay area is the on screen display area, correct both of the depth values of the detected at least one overlay area and the background image, or only the depth value of the background image, and
wherein the overlay detection unit is further configured to analyze a color component of the input monoscopic image to the extract the at least one overlay area.

18. The apparatus of claim 17, wherein the depth value correction unit is configured to correct the depth value of the detected at least one overlay area to a value that is approximate to a depth value of a region around the detected at least one overlay area.

19. The apparatus of claim 18, wherein the depth value correction unit further comprises:
a searching unit configured to search for at least one depth value of a background image located at a boundary of the detected at least one overlay area; and
an average value calculation unit configured to calculate an average value of the searched at least one depth value,
wherein the calculated average value is designated as the corrected depth value of the detected at least one overlay area.

20. The apparatus of claim 18, wherein the overlay detection unit is further configured to analyze an edge component of the input monoscopic image to extract the at least one overlay area.

21. The apparatus of claim 18, wherein the stereoscopic image generating unit is configured to generate a left-eye stereoscopic image and a right-eye stereoscopic image by calculating binocular parallax values using the corrected depth value of the at least one overlay area.

22. The apparatus of claim 17, wherein the overlay area detection unit is configured to detects the at least one overlay area based on position information of the at least one overlay area, and
wherein the position information of the at least one overlay area is in the form of coordinates indicating a position of the at least one overlay area or bitmap information showing a position of the at least one overlay area.

23. The apparatus of claim 17, wherein the depth value correction unit is further configured to determine whether to perform correcting based on at least one of a position of the at least one overlay area, the size of the at least one overlay area, and whether the at least one overlay area is moving, and
wherein the depth value correction unit is further configured to perform correcting only when it is determined to perform the correcting as a result of the determining.

24. The apparatus of claim 17, wherein the depth value correction unit is further configured to correct objects of the background image to have identical depth values.

25. The apparatus of claim 17, wherein the depth value correction unit is further configured to perform correcting such that a difference between depth values of objects of the background image is reduced.

26. The apparatus of claim 17, wherein the depth value correction unit is configured to correct a depth value of an overlay area if the depth value of the at least one overlay area is higher than the highest depth value among depth values of objects of a background by a predetermined depth; or wherein the depth value correction unit is configured to correct a depth value of an overlay area if the depth value of the at least one overlay area is higher than an average of depth values of objects of a background image by a predetermined depth.

27. The apparatus of claim 17, wherein the depth value correction unit is configured to correct a depth value of the at least one overlay area to a depth value of an overlay area in a center of the overlay area or at a boundary of the overlay area.

28. The apparatus of claim 27, wherein the depth value correction unit is further configured to perform filtering the depth value of the overlay area and the depth value of the background image to remove a difference between the depth value of the overlay area and the depth value of the background image.

29. The apparatus of claim 17, wherein the depth value correction unit is configured to correct a depth value of at least one of the detected at least one overlay area and the background image to a depth value that is obtained by respectively applying weights to the depth value of the background image and the depth value of the overlay area.

30. The apparatus of claim 17, wherein if there are a plurality of overlay areas, the depth value correction unit is further configured to correct the depth values of the plurality of overlay areas to one of a minimum value, a maximum value, or an average value of depth values of the plurality of overlay areas.

31. The apparatus of claim 17, wherein the depth value correction unit is configured to correct at least one depth value of the at least one overlay area to a depth value input by a user.

32. The apparatus of claim 17, wherein the stereoscopic image generating unit is configured to generate the at least one stereoscopic image by referring to pixel values in the background image.

33. A non-transitory computer-readable recording medium having embodied thereon a computer program product that, when executed by a computer, performs the method of claim 1.

* * * * *